(12) United States Patent
Hirai et al.

(10) Patent No.: US 12,458,916 B2
(45) Date of Patent: Nov. 4, 2025

(54) OXYGEN CONCENTRATION DEVICE (71) Applicant: Teijin Pharma Limited, Tokyo (JP)

(72) Inventors: Yuichi Hirai, Tokyo (JP); Akinobu Muramoto, Tokyo (JP)

(73) Assignee: Teijin Pharma Limited, Tokyo (JP)

( * ) Notice: Subject to any disclaimer, the term of this patent is extended or adjusted under 35 U.S.C. 154(b) by 525 days.

(21) Appl. No.: 17/914,646

(22) PCT Filed: Mar. 25, 2021

(86) PCT No.: PCT/JP2021/012447
§ 371 (c)(1),
(2) Date: Sep. 26, 2022

(87) PCT Pub. No.: WO2021/193791
PCT Pub. Date: Sep. 30, 2021

(65) Prior Publication Data
US 2023/0120349 A1 Apr. 20, 2023

(30) Foreign Application Priority Data
Mar. 27, 2020 (JP) .................. 2020-058147

(51) Int. Cl.
*B01D 53/047* (2006.01)
*A61M 16/10* (2006.01)
*B01D 53/04* (2006.01)

(52) U.S. Cl.
CPC ......... *B01D 53/047* (2013.01); *A61M 16/101* (2014.02); *B01D 53/0415* (2013.01);
(Continued)

(58) Field of Classification Search
CPC .. B01D 53/047; B01D 53/04; B01D 53/0415; B01D 2253/108; B01D 2256/12;
(Continued)

(56) References Cited

U.S. PATENT DOCUMENTS 11,247,014 B2  2/2022  Koizumi et al.
2007/0137487 A1*  6/2007  Whitley ............. B01D 53/0415
                                                            96/121
(Continued)

FOREIGN PATENT DOCUMENTS

CN    202301317 U    7/2012
JP    2006-166996 A    6/2006
(Continued)

OTHER PUBLICATIONS

International Search Report of PCT/JP2021/012447 dated May 25, 2021 [PCT/ISA/210].
(Continued)

*Primary Examiner* — Frank M Lawrence, Jr.
(74) *Attorney, Agent, or Firm* — Sughrue Mion, PLLC (57) ABSTRACT Provided is an oxygen concentration device that can facilitate easy and secure replacement work, such as attaching and detaching the adsorption cylinder while reducing the force applied from the oxygen concentration device body to the adsorption cylinder cartridge in the direction of detaching and thus ensuring the connection with the oxygen concentration device, wherein the axis line of the gas flow direction of the adsorption cylinder intersects with either connection axis in the end part for supplying pressurized air to the adsorption cylinder or the end part for extracting oxygen from the adsorption cylinder.

8 Claims, 7 Drawing Sheets (52) U.S. Cl.
CPC .... *B01D 2253/108* (2013.01); *B01D 2256/12* (2013.01); *B01D 2257/102* (2013.01); *B01D 2259/402* (2013.01); *B01D 2259/4533* (2013.01)

(58) Field of Classification Search
CPC ........ B01D 2257/102; B01D 2259/402; B01D 2259/4533; B01D 53/053; B01D 2259/40043; A61M 16/101; A61M 16/107; A61M 16/208; A61M 39/24; A61M 2202/0208
USPC ................................ 96/121, 130; 95/96, 130
See application file for complete search history.

(56) References Cited

U.S. PATENT DOCUMENTS

| | | |
|---|---|---|
| 2012/0047856 A1 | 3/2012 | Khami et al. |
| 2012/0266883 A1 | 10/2012 | Taylor et al. |
| 2017/0274171 A1 | 9/2017 | Hojo et al. |
| 2017/0361052 A1 | 12/2017 | Taylor et al. |
| 2020/0376226 A1* | 12/2020 | Galbraith ............... G16H 50/30 |
| 2023/0132087 A1* | 4/2023 | Dalisay .................. A62B 9/003 128/201.13 |

FOREIGN PATENT DOCUMENTS

| | | |
|---|---|---|
| JP | 2006-232632 A | 9/2006 |
| JP | 2010-119763 A | 6/2010 |
| JP | 2014-136134 A | 7/2014 |
| TW | 201733633 A | 10/2017 |

OTHER PUBLICATIONS

Office Action issued May 11, 2024 in Chinese Application No. 202180024799.6.

International Preliminary Report on Patentability dated Sep. 22, 2022 with a Translation of the Written Opinion of the International Searching Authority in Application No. PCT/JP2021/012447.

* cited by examiner

OXYGEN CONCENTRATION DEVICE

TECHNICAL FIELD

The present invention relates to an oxygen concentration device that concentrates oxygen by adsorbing nitrogen in the air with adsorbent and supplies it to a user.

BACKGROUND ART

In recent years, the number of patients suffering from chronic respiratory diseases, such as emphysema, pulmonary tuberculosis sequelae and chronic bronchitis, tends to increase, and as a treatment method for such patients, oxygen inhalation therapy in which high concentration oxygen is inhaled has been performed. Oxygen inhalation therapy is a treatment method in which oxygen gas or oxygen concentrated gas is inhaled to the patient. Examples of the source of therapeutic oxygen gas or concentrated oxygen gas include the use of high-pressure oxygen cylinders, liquid oxygen cylinders, oxygen concentration devices, and the like, and the oxygen concentration devices are increasingly used for the reason that they are capable of long continuous operation and are easy to use.

In particular, there has been put into practical use a pressure swing adsorption-type oxygen concentration device that separates oxygen in the air and supplies it as a product gas, and is used as a medical oxygen concentration device for the treatment of patients with chronic respiratory diseases. Recently, a battery-powered portable oxygen concentration device has been developed instead of carrying an oxygen cylinder when going out, which use is expanding. As oxygen concentration devices are increasingly used in ordinary households, these portable devices are required to be small, lightweight, inexpensive, and easy to assemble and maintain.

In the oxygen concentration device, the nitrogen adsorption performance of the adsorption cylinder deteriorates due to aging, such as deterioration of the adsorbent by moisture adsorption, resulting in a decrease in oxygen-generating ability. Since it is difficult to replace the adsorbent except when the equipment is overhauled, there has been developed an oxygen concentration device equipped with an adsorption cylinder cartridge for replacing the entire adsorption cylinder filled with adsorbent. Disclosed is a method of fitting and joining the joint part of the adsorption cylinder cartridge, which is a replacement part, to the flow path of the oxygen concentration device body by bringing the flange at the tip part of the joint into contact with the rear surface of the sheet metal and screwing it on the frame during maintenance (PTL 1). Further, there has been developed a device that adopts an adsorption cylinder cartridge easier to attach or detach, which enables the user to replace an adsorption cylinder on deterioration due to moisture adsorption (PTL 2).

CITATION LIST

Patent Literature

[PTL 1] Japanese Unexamined Patent Publication No. 2010-119763
[PTL 2] U.S. Patent Application Publication No. 2012/0266883

SUMMARY OF INVENTION

Technical Problem

The pressure swing adsorption-type oxygen concentration device continuously generates oxygen by performing an adsorption step in one of the two adsorption cylinders and a desorption step in the other adsorption cylinder and sequentially switching steps between adsorption and desorption: an adsorption step of supplying pressurized air from a compressor to an adsorption cylinder, adsorbing and removing nitrogen under pressurized conditions to extract unadsorbed oxygen, and desorption step of opening an adsorption cylinder to the air, thereby desorbing and removing nitrogen to regenerate the adsorbent. Oxygen with a high concentration of 90% or more can be separated from the air and supplied by connecting a compressor, two adsorption cylinders, and a product tank to store generated oxygen to flow paths, such as a raw material air supply path, an oxygen supply flow path to take out oxygen and supply it to a user, an exhaust flow path to desorb and exhaust nitrogen adsorbed on the adsorbent, an equalizing flow path to equalize the pressure between cylinders, and a purge flow path, via an solenoid valve of a flow path switching means, and switching and controlling the solenoid valve in each flow path.

Although such an oxygen concentration device uses a nitrogen adsorbent, such as zeolite, to adsorb and remove nitrogen in the air to generate unadsorbed oxygen while desorbing and removing nitrogen to regenerate the adsorbent, when moisture in the air is adsorbed on the adsorbent, the moisture cannot be desorbed and removed, causing aging. Therefore, it is necessary to replace the adsorbent at overhaul. When a fixing method using a fixing part integrated with a screw as described in PTL 1 is used, the maintainability is too poor for a user to replace the parts.

In an oxygen concentration device using an adsorption cylinder cartridge that can be easily replaced by a user as described in PTL 2, a flow path of the oxygen concentration device and an adsorption cylinder are connected by pushing the adsorption cylinder cartridge into the adsorption cylinder storage space of the oxygen concentration device body. When the device is a type of pushing the cartridge in the axial direction of the adsorption cylinder, both end parts of the adsorption cylinder are simultaneously connected to the flow path of the device body by arranging the connection port at the center of the tip part of the adsorption cylinder's end and the connection port on the other end part side parallel in the same direction as the tip part of the adsorption cylinder's end at a position from the center of the adsorption cylinder to the periphery of the adsorption cylinder and then pushing the cartridge into the storage space. In addition, when the device is a type having connection ports provided in the direction perpendicular to the axes of both end parts of the adsorption cylinder, both end parts are simultaneously connected to the flow path of the oxygen concentration device body by pushing the adsorption cylinder cartridge from lateral direction into the storage part of the device body.

Since such an adsorption cylinder cartridge is required to be easily connected and disconnected, the connection part is not fixed. In either method, since a force is applied during pressurization to both end parts of the adsorption cylinder in the direction to detach the cartridge, a stopper is required to be additionally provided for fixing the cartridge to the oxygen concentration device. The problem is whether the user of the oxygen concentration device can handle the stopper to be securely hooked, and use of the oxygen concentration device in a state of unfixed cartridge and insufficient connection will leave a safety problem, such as oxygen leakage and a decrease in oxygen concentration.

When an easily attachable/detachable one-touch joint is used to connect the flow path between the adsorption cylinder and the oxygen concentration device body, a workspace for attaching/detaching is required around both end parts of the adsorption cylinder, which leaves a problem of a conflicting demand between ensuring the reliability of fitting and miniaturizing the device.

Solution to Problem

The present invention provides a device that can facilitate easy and secure replacing work, such as attaching and detaching the adsorption cylinder, while reducing the force applied from the oxygen concentration device body to the adsorption cylinder cartridge in the direction of detaching and thus ensuring the connection with the oxygen concentration device.

The present invention provides a pressure swing adsorption-type oxygen concentration device equipped with an adsorption cylinder filled with an adsorbent selectively adsorbing nitrogen rather than oxygen to separate and generate oxygen in pressurized air, a compressor to supply pressurized air, and a flow path switching means for switching between a flow path for an adsorption step and for a desorption step, wherein the adsorption cylinder is a replaceable adsorption cylinder cartridge, and the axis line of the adsorption cylinder, which is the gas flow direction, intersects with either connection axis in the end part for supplying pressurized air to the adsorption cylinder or the end part for extracting oxygen from the adsorption cylinder.

Further, the present invention provides an oxygen concentration device, wherein the adsorption cylinder cartridge is equipped with two adsorption cylinders one of which is generating oxygen in an adsorption step while the other adsorption cylinder is performing a desorption step to desorb nitrogen for regeneration, and an adsorption cylinder fixing base having two flow paths for supplying pressurized air to each adsorption cylinder in a direction perpendicular to the gas flow direction in the cylinder and a raw material air supply end part, and both are fixed in an integrated state, and wherein a piping nozzle to supply pressurized air from a compressor via a flow path switching means and the raw material air supply end part of the adsorption cylinder cartridge form a connection mechanism with detachable fitting, and an O-ring is provided at a concave part of the raw material air supply end part of the adsorption cylinder fixing base, an integrally molded nozzle of two piping nozzles to supply pressurized air is provided and a fixture is provided for fixing the nozzle and a casing of the oxygen concentration device with a fitted and connected state between the integrally molded pipe nozzle and the raw material air supply end part.

Further, the present invention provides an oxygen concentration device, wherein the adsorption cylinder cartridge is equipped with two adsorption cylinders one of which is generating oxygen in an adsorption step while the other adsorption cylinder is performing a desorption step to desorb nitrogen for regeneration, and an adsorption cylinder fixing base having two flow paths for extracting generated oxygen from each adsorption cylinder in a direction perpendicular to the gas flow direction in the cylinder and an oxygen extraction end part, and both are fixed in an integrated state, and wherein an oxygen extraction end nozzle to supply generated oxygen in the adsorption cylinder to a user supply means side and an oxygen extraction end part of the adsorption cylinder cartridge form a connection mechanism with detachable fitting, and an O-ring is provided at a concave part of the oxygen extraction end part of the adsorption cylinder fixing base, an integrally molded nozzle of two oxygen extraction end nozzles is provided and a fixture for fixing the nozzle and a casing of the oxygen concentration device with a fitted and connected state between the oxygen extraction end nozzle and the oxygen extraction end part.

Further, the present invention provides an oxygen concentration device, wherein the fixture is pivotably connected and fixed at both ends of integrally molded two piping nozzles and has a connection part to be detachably screwed to the bottom surface of the casing of the oxygen concentration device, or wherein the fixture is pivotably connected and fixed at both ends of integrally molded two oxygen extraction end nozzles and has a connection part to be detachably screwed to the bottom surface of the casing of the oxygen concentration device.

Advantageous Effects of Invention

The oxygen concentration device of the present invention allows the user to easily replace the adsorption cylinder that is deteriorated due to moisture adsorption to impair oxygen-generating ability, and to attach securely the cartridge of the adsorption cylinders to the oxygen concentration device body maintaining the gas seal without causing oxygen leakage from the connection part.

DESCRIPTION OF EMBODIMENTS

An embodiment of the oxygen concentration device of the present invention will be described with reference to the drawings.

Figure 1:
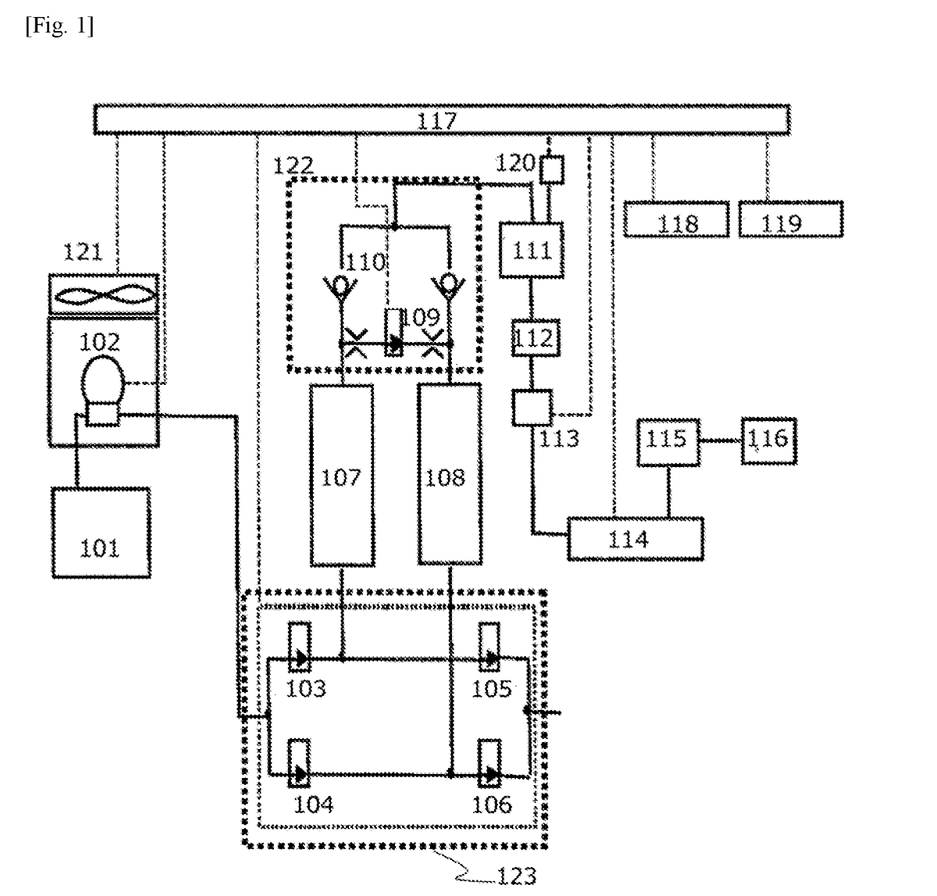
FIG. 1 shows a schematic device configuration diagram of the oxygen concentration device of the present invention.

FIG. 1 is a schematic configuration diagram showing the pressure swing adsorption-type oxygen concentration device according to one example of an embodiment of the present invention. The oxygen concentration device of the present invention comprises: a compressor 102 which supplies pressurized air; an adsorption cylinder A 107 and an adsorption cylinder B 108 both packed with an adsorbent which selectively adsorbs nitrogen rather than oxygen; and flow path switching means of a supply valve A 103, a supply valve B 104, an exhaust valve A 105, an exhaust valve B 106, and a pressure equalizing valve 109, that switch among sequences of an adsorption step, a desorption step, a pressure equalizing step, and the like. An oxygen-concentrated gas generated by separation from the pressurized air is adjusted to a prescribed flow rate by a control valve 113, and then supplied to a user by using a cannula 116.

First, raw material air is brought into the oxygen concentration device from outside through an air intake port equipped with an external air intake filter 101 and the like for eliminating foreign matter, such as dust. In this case, normal air contains about 21% oxygen gas, about 77% nitrogen gas, 0.8% argon gas, and 1.2% other gases, such as carbon dioxide. Such an oxygen concentration device concentrates only the oxygen gas, which is essential for respiration, and extracts the oxygen-concentrated gas.

Extraction of the oxygen-concentrated gas is performed by supplying raw material air compressed by the compressor to an adsorption cylinder packed with an adsorbent composed of zeolite and the like, which selectively adsorbs nitrogen molecules rather than oxygen molecules, while switching a target cylinder between the adsorption cylinders A and B sequentially by opening and closing the supply valves A and B, and the exhaust valves A and B, and then by selectively adsorbing and removing nitrogen gas contained in the raw material air in the adsorption cylinder at a concentration of about 77%. As such an adsorbent, there can be used molecular sieve zeolite, such as Type 5A, Type 13X, and Type Li-X.

Although the adsorption cylinder is made of a cylindrical container packed with an adsorbent and usually used are a one-cylinder type, a two-cylinder type and, in addition, a multi-cylinder type such as a three or more-cylinder type, in order to produce the oxygen-concentrated gas continuously and efficiently from the raw material air, it is preferable to use an adsorption cylinder configuration of a two-cylinder type or a multi-cylinder type. Further, as the above-mentioned compressor, there may be used a compressor having merely a compressing function or both compressing and evacuating functions, and a two-head type swing air compressor as well as a rotational air compressor, such as screw type, rotary type, and scroll type. Further, either alternating current or direct current may be used as a power source of an electric motor for driving the compressor.

In the adsorption cylinder, nitrogen gas in the air is adsorbed by the adsorbent in a compressed state, and the oxygen-concentrated gas containing unadsorbed oxygen as a main component is extracted from a product end of the adsorption cylinder and flows into a product tank via a check valve equipped to prevent the oxygen-concentrated gas from flowing back into the adsorption cylinder. On the other hand, the nitrogen gas adsorbed on the adsorbent packed in the adsorption cylinder needs to be desorbed from the adsorbent and purged, in order for the adsorbent to adsorb nitrogen again from newly introduced raw material air. For this purpose, the adsorption cylinder is connected to an exhaust line via the exhaust valve, and a compressed state is switched to a state of opening to the air, thereby desorbing nitrogen adsorbed in a compressed state and exhausting it into the air to regenerate the adsorbent. Further, in this desorption step, a purge step is performed in order to improve the efficiency of nitrogen desorption, wherein a part of the oxygen-concentrated gas generated is flowed back as a purging gas from the product end side of the adsorption cylinder in the adsorption step to the adsorption cylinder in the desorption step via the pressure equalizing valve.

The oxygen-concentrated gas stored in the product tank 111 contains oxygen of a high concentration of, for example, 95%, and a necessary oxygen flow rate is set by a patient in accordance with a doctor's prescription. The prescribed amount of oxygen-concentrated gas is supplied to the patient with the supply flow rate and pressure controlled using a flow rate adjusting means, such as a pressure regulating valve 112 and a control valve 113. On the other hand, the flow rate and the oxygen concentration of the oxygen-concentrated gas supplied to the patient are detected by an oxygen concentration sensor/flow rate sensor 114 and, based on the detection results, the rotation speed of the compressor, and the opening/closing time of the flow path switching valve are controlled by an operating means 117, such as CPU, to control oxygen generation.

In a two-cylinder pressure swing adsorption-type oxygen concentration device, while one adsorption cylinder A 107 is performing an adsorption step, the other adsorption cylinder B 108 performs a desorption step, and thus the steps of the cylinders A and B are sequentially switched between the adsorption step and desorption step so as to be in opposite phase with each other by controlling opening/closing of the supply valve A 103, the supply valve B 104, the exhaust valve A 105, the exhaust valve B 106, and the pressure equalizing valve 109, resulting in continuous oxygen generation. Oxygen can be produced efficiently by incorporating a purge step (a purge-generation step and a purge-exhaust step) in which a part of the oxygen generated in the adsorption step is passed to the adsorption cylinder at the desorption step side via the pressure equalizing valve 109 in order to improve the regeneration efficiency, and by carrying out a routine sequence of switching between two series of steps in cylinders A and B alternately: in one adsorption cylinder A 107, a series of adsorption step, purge-generation step, desorption step, and purge-exhaust step and in the other adsorption cylinder B 108, a series of desorption step, purge-exhaust step, adsorption step, and purge-generation step. Such a switching flow path controls supplying raw material gas to the adsorption cylinders A and B and exhausting nitrogen from the adsorption cylinder by switching the solenoid valves of supply valves A and B and exhaust valves A and B on the raw material end side of the adsorption cylinder, and also extracting oxygen from the adsorption cylinder to the product tank 111 and purging the adsorption cylinder by opening/closing control of the check valve 110 and pressure equalizing valve 109 on the product end side of the adsorption cylinder, and the complicated piping is arranged into a manifold by manifold molded bodies 122 and 123, enabling the flow paths to be put together.

The adsorption cylinder is connected by fitting and inserting between a joint provided at the raw material supply end of the adsorption cylinder and a pipe joint on the flow path switching valve side for supplying pressurized air of the oxygen concentration device body or exhausting nitrogen, and by fitting and inserting between a joint provided at the product end of the adsorption cylinder and a pipe joint for extracting the product oxygen gas.

Usually, a joint is provided on the central axis of both ends of the adsorption cylinder, and is fixed by fitting and inserting with the pipe joint. In order to facilitate the replacement work of the adsorption cylinder, when the adsorption cylinder cartridge need to be attached only by push-in operation, there can be adopted a vertical push-in type adsorption cylinder in which one joint is provided at the center of one end of the adsorption cylinder and the other joint is provided by turning back the flow path from the other end part to be parallel to the air flow of the adsorption cylinder and a lateral push-in type adsorption cylinder in which joints are provided perpendicularly to the flow path of the adsorption cylinder at the side surface of the both end parts of the adsorption cylinder. However, in any type of the adsorption cylinder, pressure is always applied in the direction of detaching from the oxygen concentration device body, and the oxygen concentration device body and the adsorption cylinder require secure fixing.

On the other hand, fixing the oxygen concentration device body and both end parts of the adsorption cylinder with screws or the like makes the replacement work difficult. Even when a locking means is provided at the connection part, an unlock operation is required when replacing the adsorption cylinder, and even when a simple locking means, such as a one-touch joint, is adopted, an unlock operation requires to secure a workspace for replacing, resulting in need for removing the main body cover and the like.

In addition, when the adsorption cylinder is provided as separable from the oxygen concentration device body, the fitting part between the flow path in the body and the adsorption cylinder requires a seal with an O-ring or a gasket to prevent gas leakage from the connection part. O-rings and gaskets are made of rubber and known to adhere to bodies coming into contact with due to temperature and aging. Seal parts are provided on both end sides of the adsorption cylinders A and B, and separation of these parts at once for replacing the adsorption cylinders may generate too heavy a load to perform a simple replacement depending on the adherence state.

Figure 3:
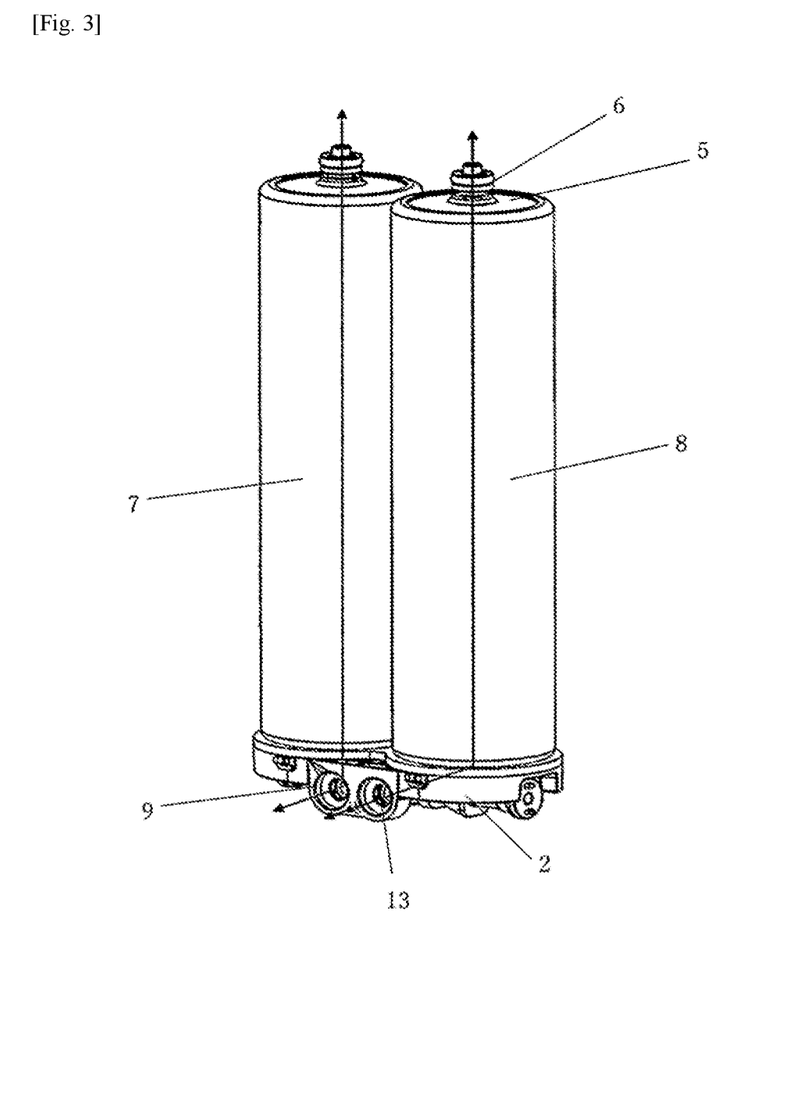
FIG. 3 shows an external view of an adsorption cylinder cartridge used in the oxygen concentration device of the present invention.

The adsorption cylinder used in the oxygen concentration device of the present invention is a replaceable adsorption cylinder cartridge as shown in FIG. 3, and as shown by arrows, the axis line of the adsorption cylinder, which is the direction of gas flow, intersects with either connection axis in the end part for supplying pressurized air to the adsorption cylinder or the end part for extracting oxygen from the adsorption cylinder. From the above, the seal parts at both ends of the adsorption cylinder are not disconnected all at once, which reduces the peeling load due to adherence of the O-ring or gasket. When the gas flow axis and both ends of the adsorption cylinder are located on the same axis, the seal parts must be disconnected for each end part to reduce the adhering load of the seal parts. It is difficult to perform this kind of replacement with an adsorption cylinder-integrated cartridge, resulting in poor maintainability.

Assuming the axis of the gas flow direction of the adsorption cylinder is vertical, the end part for supplying raw material air to the adsorption cylinder or the end part for extracting oxygen from the adsorption cylinder is laterally connected, and the crossing angle between the gas flow axis and the connection axis is in the range of 90±30 degrees, and preferably 90±10 degrees. Such a crossing angle may have any value as long as it enables lateral connection to the pressurized air supply end part and the like of the adsorption cylinder, is usually 90 degrees, and includes a range of designable angles.

A two-cylinder oxygen concentration device is equipped with two adsorption cylinders 7 and 8 having an oxygen extraction end nozzle 6 at the oxygen extraction end 5 of the adsorption cylinder and a fixing base 2 having two flow paths for supplying pressurized air to each adsorption cylinder in the direction perpendicular to the gas flow direction of the adsorption cylinder and a concave part 9 of raw material air supply end, and has an adsorption cylinder cartridge which is formed by integrating each adsorption cylinder and the fixing base. In addition, an adsorption cylinder cartridge can be used which is equipped with two adsorption cylinders having a raw material air supply end part at one end and a fixing base having two flow paths for extracting oxygen from each adsorption cylinder in the direction perpendicular to the gas flow direction of the adsorption cylinder and the oxygen extraction end part, and is formed by integrating each adsorption cylinder and the fixing base. Either arrangement of the pressurized air supply end part and the oxygen extraction end part can be adopted depending on the design, but it is preferable from the viewpoint of workability during replacement and visibility of the fitting part between the body and the adsorption cylinder that the end part perpendicular to the flow path axis of the adsorption cylinder is located on the easily accessible side during replacement.

The connection between the adsorption cylinder cartridge and the oxygen concentration device body is provided with an O-ring 13 at the concave part 9 of raw material air supply end in the fixing base 2 of the adsorption cylinder, when a detachable fitting connection mechanism is formed between the piping nozzle for the pressurized air supplied from the compressor via the flow path switching means and the raw material air supply end part of the adsorption cylinder cartridge. The O-ring to maintain gas seal should be provided on the adsorption cylinder cartridge side, and be replaced during replacement work of the adsorption cylinder. Providing an O-ring on the connection nozzle on the device body side may cause the O-ring coming off during replacement of the adsorption cylinder, damage the O-ring during replacement to cause a seal failure, and has a risk of forgetting to attach to cause a new adsorption cylinder cartridge to be connected without O-ring, which is not preferable. In such an example, though the pressurized air supply end on the oxygen concentration device body side has a convex shape using a nozzle, and the raw material air supply end of the fixing base of the adsorption cylinder cartridge has a concave part shape in which the nozzle fits, the connection part may be designed with the concave and convex reversed.

Figure 2:
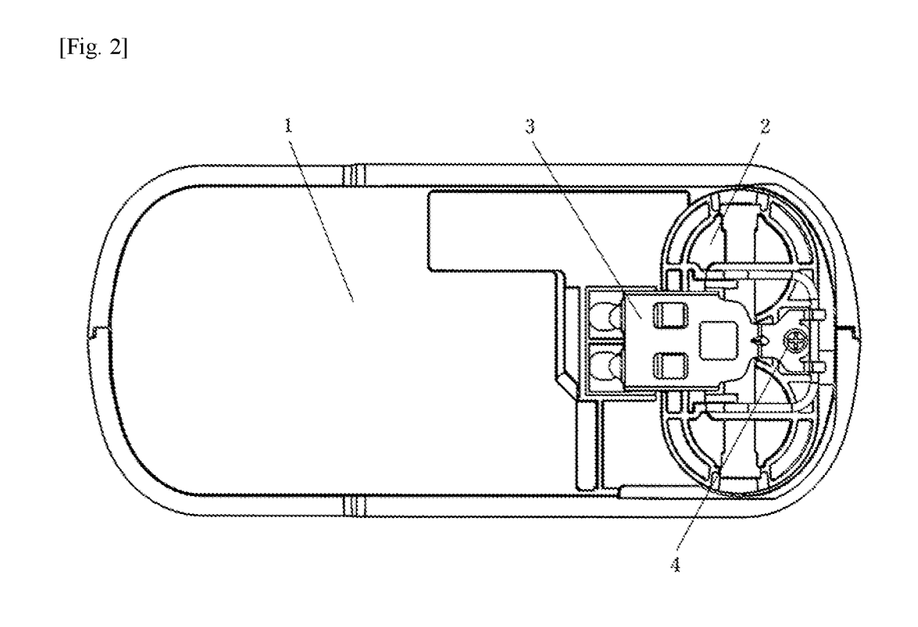
FIG. 2 shows a bottom view of an oxygen concentration device equipped with an adsorption cylinder cartridge of the present invention.

FIG. 2 shows a bottom view of an oxygen concentration device equipped with an adsorption cylinder cartridge shown in FIG. 3, and FIGS. 4 to 8 show a method of attaching and detaching the adsorption cylinder cartridge.

Figure 5:
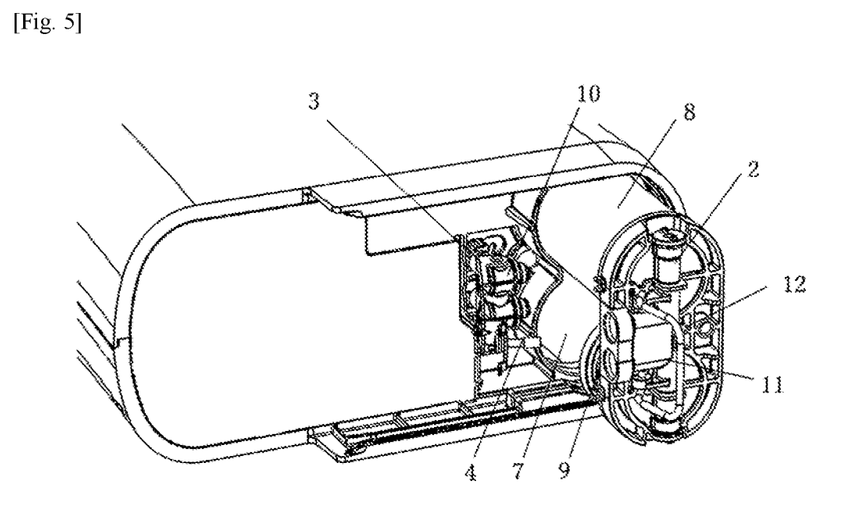
FIG. 5 shows a bottom perspective view showing a method of attaching and detaching an adsorption cylinder cartridge.

The two piping nozzles supplying raw material air to each of the two adsorption cylinders 7 and 8 become a raw material air supply end nozzle 10 integrally molded as shown in FIG. 5 for easy connection, and the two piping nozzles and the two concave parts 9 of raw material air supply end are fitted and connected in one operation. Since the connection part, left as connected, will loosen due to the pressure from the compressor or the adsorption cylinder, a fixture 3 for fixing the integrally molded raw material air supply end nozzle 10 and the casing of the oxygen concentration device is provided to prevent the loosening, and the fixing is performed by pinning or screwing or with a hook or the like under the conditions of complete connection of the nozzle, which is preferable. Under the loose conditions of connection part, the positions of screws and the like and the fixing holes do not match, which does not allow fixing by the fixture, thus secure joining is allowed.

Figure 4:
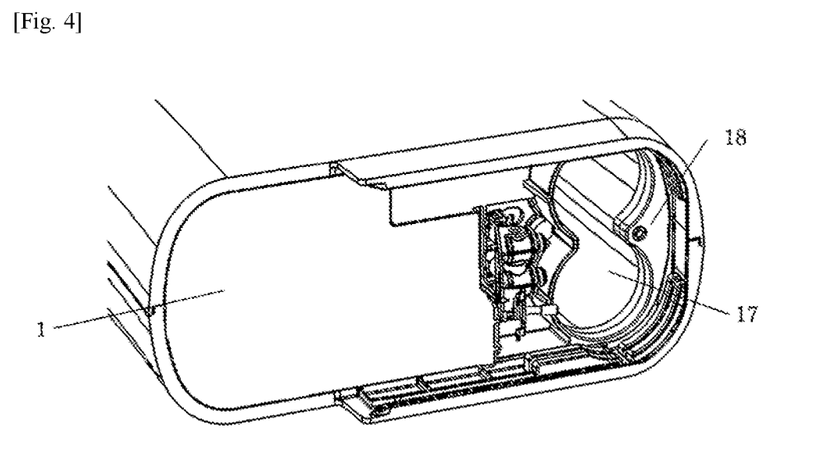
FIG. 4 shows a bottom perspective view showing a method of attaching and detaching an adsorption cylinder cartridge.

FIG. 4 is a perspective view of the bottom surface part of the oxygen concentration device with the adsorption cylinder detached, and shows a state in which the battery for driving the oxygen concentration device, the cover, and the like provided on the bottom part side are detached. The bottom surface side of the oxygen concentration device is equipped with a casing part 17 for holding the adsorption cylinder.

Figure 6:
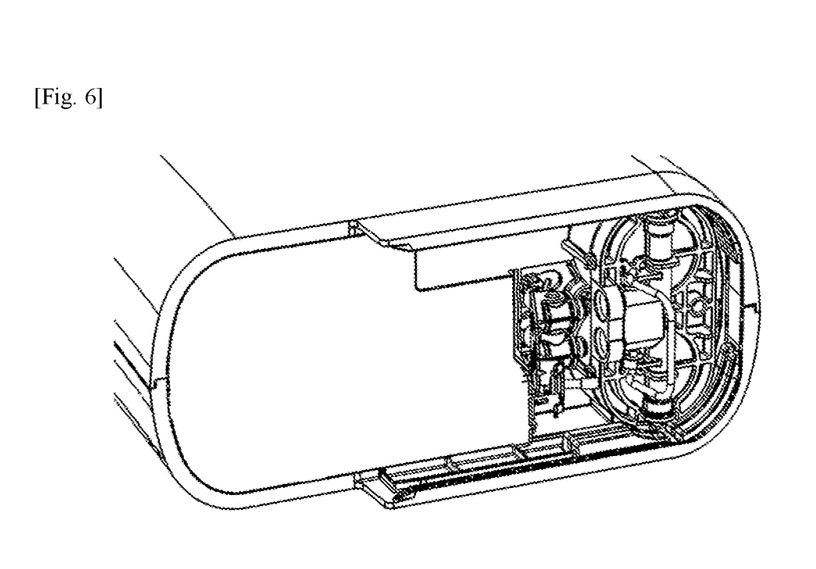
FIG. 6 shows a bottom perspective view showing a method of attaching and detaching an adsorption cylinder cartridge.
Figure 7:
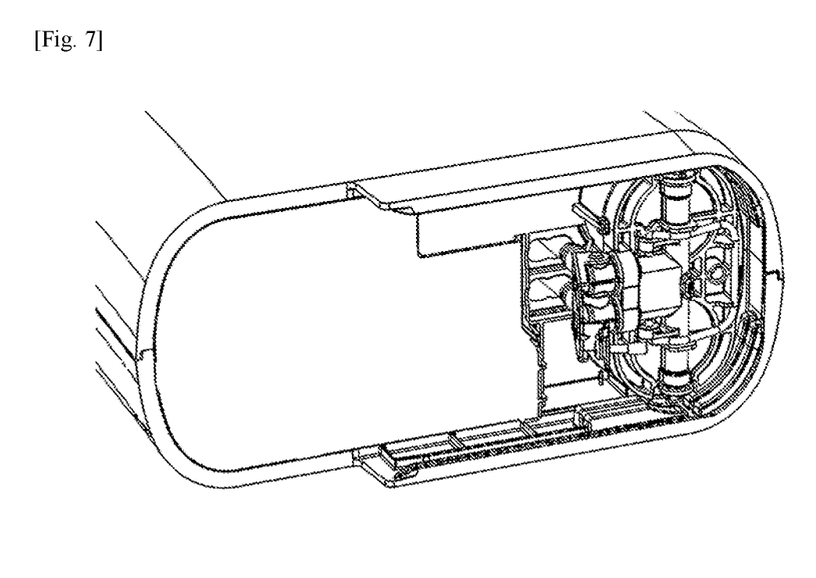
FIG. 7 shows a bottom perspective view showing a method of attaching and detaching an adsorption cylinder cartridge.

As shown in FIGS. 5 and 6, the oxygen extraction end nozzle 6 at the tip of the adsorption cylinder of the adsorption cylinder cartridge shown in FIG. 3 is inserted toward and pushed in the casing part 17 of the adsorption cylinder of the oxygen concentration device. As a result, the oxygen extraction end part of the adsorption cylinder is connected to the flow path on the product tank side provided in the casing concave part of the oxygen concentration device. Next, as shown in FIG. 7, the raw material air supply end nozzle 10, formed by integrating the two nozzles at the tip of the pipe for supplying raw material air from the compressor side, is inserted and pushed to connect into the concave part 9 of raw material air supply end, which is the connection port of the adsorption cylinder, while pinching the metal plate fixture 3 pivotably attached to the nozzle.

Figure 8:
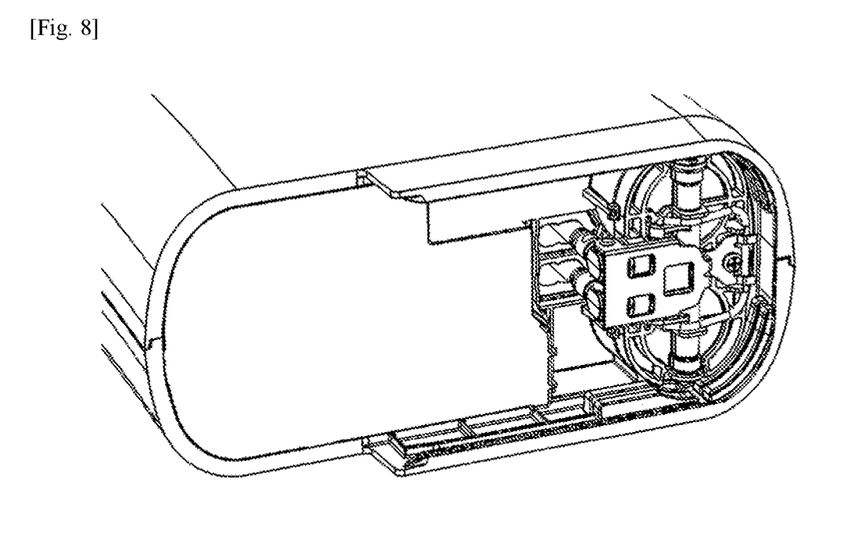
FIG. 8 shows a bottom perspective view showing a method of attaching and detaching an adsorption cylinder cartridge.

Next, as shown in FIG. 8, the screw 4 provided on the metal plate fixture 3 is screwed into the screw hole 18 on the bottom surface of the casing of the oxygen concentration device body via the fixing base bottom surface hole 12 of the adsorption cylinder cartridge. At this time, when the piping connection between the adsorption cylinder and the oxygen concentration device body is insufficient, the screw hole 18 is not at the predetermined position and thus screwing is not allowed, which enables the person replacing the cylinder to easily determine the connection state. Then, pushing again the adsorption cylinder or the piping nozzle to the correct position will allow the screwing to complete. This makes it possible to prevent problems, such as leakage of raw material supply gas and decrease in oxygen concentration due to insufficient pressure.

Detaching the adsorption cylinder cartridge can be performed by the reverse operation of the above to easily detach the adsorption cylinder from the oxygen concentration device body.

Figure 9:
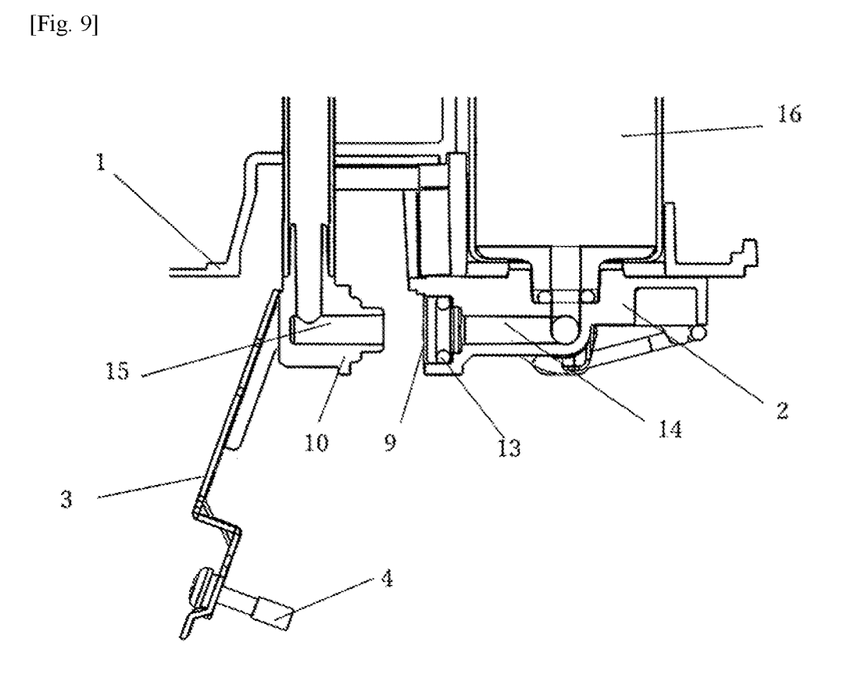
FIG. 9 shows a cross-sectional view showing the shapes of an adsorption cylinder, a piping nozzle, and a fixture.
Figure 10:
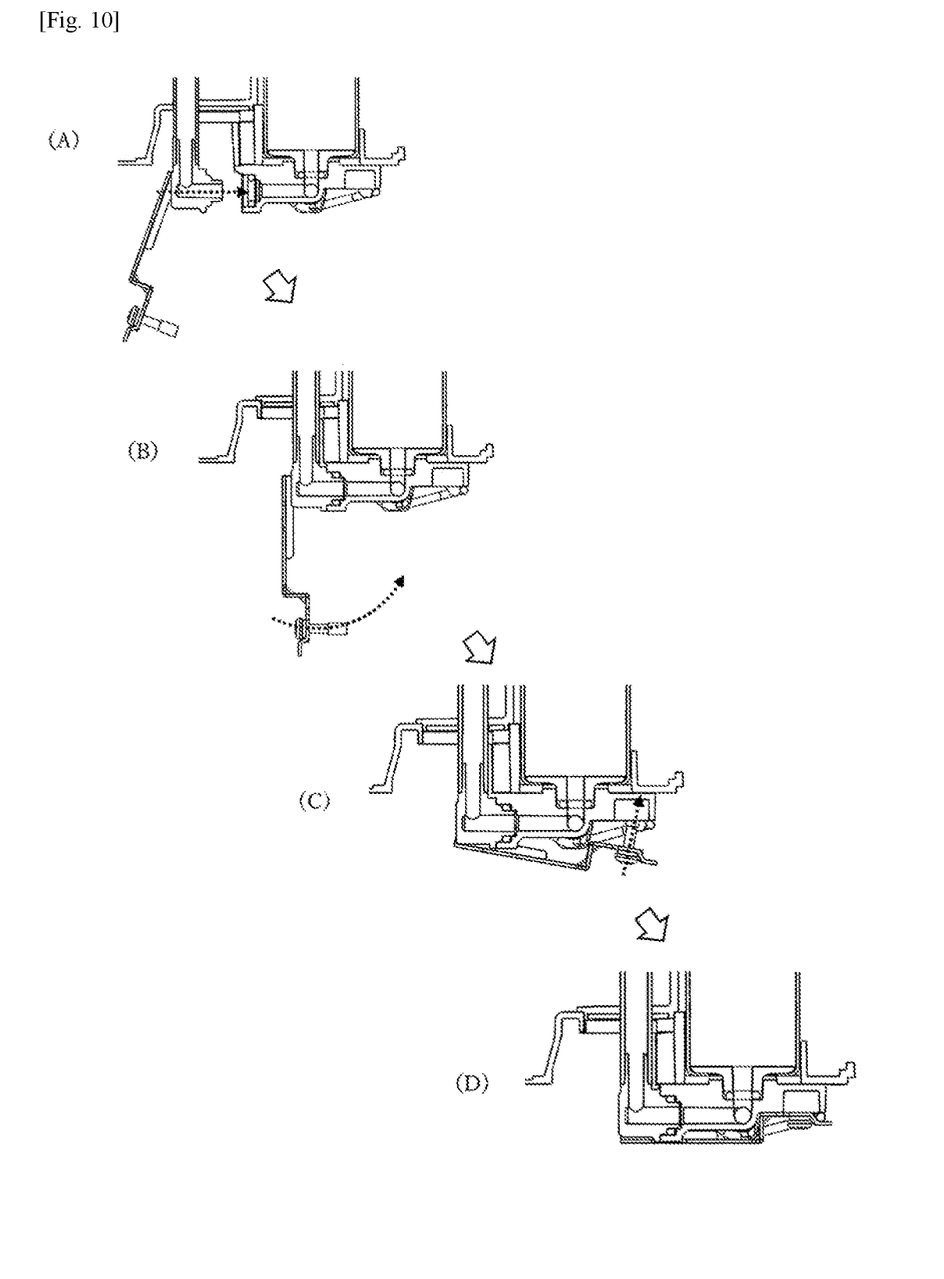
FIG. 10 shows a method of connecting an adsorption cylinder and a piping nozzle and fixing a fixture.

FIG. 9 shows a cross-sectional configuration diagram of a connection part between the adsorption cylinder cartridge and the piping nozzle, and FIG. 10 shows a cross-sectional view showing a method of fixing the piping nozzle with a fixture. As shown in (A) of FIG. 10, the piping nozzle is connected to the concave part 9 of raw material air supply end of the adsorption cylinder cartridge while holding the metal plate fixture 3 pivotably attached to the side surface of the integrated raw material air supply end nozzle 10. As shown in (B), the raw material air supply end nozzle 10 is sealed by an O-ring 13 provided inside the concave part 9 of raw material air supply end. This completes the piping connection between the piping nozzle for supplying raw material air and the adsorption cylinder. Next, as shown in (C), while pivoting the fixture 3, the fixture 3 is pressed against the screw hole 18 of the bottom surface of the casing of the oxygen concentration device so as to cover the bottom surface of the adsorption cylinder cartridge, and then screwed. When the connection between the piping nozzle and the adsorption cylinder is insufficient, the positions of the screw and screw hole do not match, and as shown in (D), the screw fits in the predetermined screw hole by further pushing the piping nozzle into the concave part of raw material air supply end, and thus the adsorption cylinder can be fixed.

INDUSTRIAL APPLICABILITY

The oxygen concentration device of the present invention enables the user to replace the adsorption cylinder easily and securely, and thus contributes to reduction of the maintenance work and cost.

REFERENCE SIGNS LIST

1 Bottom surface of oxygen concentration device body
2 Fixing base of adsorption cylinder cartridge
3 Metal plate fixture
4 Screw
5 Oxygen extraction end part of adsorption cylinder cartridge
6 Oxygen extraction end nozzle of adsorption cylinder cartridge
7 Adsorption cylinder A
8 Adsorption cylinder B
9 Concave part of raw material air supply end
10 Piping nozzle for supplying raw material air of oxygen concentration device body
11 Handle
12 Bottom surface hole of fixing base of adsorption cylinder cartridge
13 O-ring
14 Raw material air flow path for adsorption cylinder cartridge
15 Raw material air flow path for piping nozzle supplying raw material air of oxygen concentration device body
16 Adsorption cylinder
17 Adsorption cylinder cartridge storage part
18 Screw hole
101 Intake filter
102 Compressor
103 Supply valve A
104 Supply valve B
105 Exhaust valve A
106 Exhaust valve B
107 Adsorption cylinder A
108 Adsorption cylinder B
109 Pressure equalizing valve
110 Check valve
111 Product tank
112 Pressure regulating valve
113 CV
114 Oxygen concentration/flow rate sensor
115 Filter
116 Cannula
117 CPU
118 Temperature sensor
119 Flow rate setting part
120 Pressure sensor
121 Cooling fan
122 Manifold molded body
123 Manifold molded body

The invention claimed is:

1. A pressure swing adsorption oxygen concentration device equipped with an adsorption cylinder filled with an adsorbent selectively adsorbing nitrogen rather than oxygen to separate and generate oxygen in pressurized air, a compressor to supply pressurized air, and a flow path switching means for switching between a flow path for an adsorption step and for a desorption step, wherein the adsorption cylinder is a replaceable adsorption cylinder cartridge, and an axis line of the adsorption cylinder, which is the gas flow direction, intersects with either connection axis in an end part for supplying pressurized air to the adsorption cylinder or an end part for extracting oxygen from the adsorption cylinder, wherein the adsorption cylinder cartridge is equipped with two adsorption cylinders, one of which is generating oxygen in an adsorption step while the other adsorption cylinder is performing a desorption step to desorb nitrogen for regeneration, and an adsorption cylinder fixing base having two flow paths for supplying pressurized air to each adsorption cylinder in a direction perpendicular to the gas flow direction in the cylinder and a raw material air supply end part, and both are fixed in an integrated state, wherein a piping nozzle to supply pressurized air from the compressor via the flow path switching means and the raw material air supply end part of the adsorption cylinder cartridge form a connection mechanism with detachable fitting, and an O-ring is provided at a concave part of the raw material air supply end part of the fixing base.

2. The oxygen concentration device according to claim 1, wherein an integrally molded nozzle of two piping nozzles to supply pressurized air is provided and a fixture is provided for fixing the piping nozzle and a casing of the oxygen concentration device with a fitted and connected state between the integrally molded piping nozzle and a concave part of the raw material air supply end part.

3. The oxygen concentration device according to claim 2, wherein the fixture is pivotably connected and fixed at both ends of the integrally molded piping nozzle, and has a connection part to be detachably screwed to the bottom surface of the casing.

4. The oxygen concentration device according to claim 1, wherein a crossing angle between the axis line in the gas flow direction of the adsorption cylinder cartridge and either connection axis in the pressurized air supply end part or the end part for extracting oxygen from the adsorption cylinder is 90±10 degrees.

5. A pressure swing adsorption oxygen concentration device equipped with an adsorption cylinder filled with an adsorbent selectively adsorbing nitrogen rather than oxygen to separate and generate oxygen in pressurized air, a compressor to supply pressurized air, and a flow path switching means for switching between a flow path for an adsorption step and for a desorption step, wherein the adsorption cylinder is a replaceable adsorption cylinder cartridge, and an axis line of the adsorption cylinder, which is the gas flow direction, intersects with either connection axis in an end part for supplying pressurized air to the adsorption cylinder or an end part for extracting oxygen from the adsorption cylinder, wherein the adsorption cylinder cartridge is equipped with two adsorption cylinders, one of which is generating oxygen in an adsorption step while the other adsorption cylinder is performing a desorption step to desorb nitrogen for regeneration, and an adsorption cylinder fixing base having two flow paths for extracting generated oxygen from each adsorption cylinder in a direction perpendicular to the gas flow direction in the cylinder and an oxygen extraction end part, and both are fixed in an integrated state, wherein an oxygen extraction end nozzle to supply generated oxygen in the adsorption cylinder to a user supply means side and the oxygen extraction end part of the adsorption cylinder cartridge form a connection mechanism with detachable fitting, and an O-ring is provided at a concave part of the oxygen extraction end part of the adsorption cylinder fixing base.

6. The oxygen concentration device according to claim 5, wherein an integrally molded nozzle of two oxygen extraction end nozzles is provided and a fixture for fixing the nozzle and a casing of the oxygen concentration device with a fitted and connected state between the integrated oxygen extraction end nozzle and the concave part of the oxygen extraction end part.

7. The oxygen concentration device according to claim 6, wherein the fixture is pivotably connected and fixed at both ends of the integrally molded two oxygen extraction end nozzles, and has a connection part to be detachably screwed to the bottom surface of the casing.

8. The oxygen concentration device according to claim 5, wherein a crossing angle between the axis line in the gas flow direction of the adsorption cylinder cartridge and either connection axis in the pressurized air supply end part or the end part for extracting oxygen from the adsorption cylinder is 90±10 degrees.

\* \* \* \* \*